United States Patent Office 2,934,522
Patented Apr. 26, 1960

2,934,522

RESINOUS POLYALCOHOLS OBTAINED FROM NOVOLAKS AND STYRENE OXIDE

Alexander M. Partansky, Concord, and Paul G. Schrader, Antioch, Calif., assignors to The Dow Chemical Company, Midland, Mich., a corporation of Delaware No Drawing. Application January 26, 1956
Serial No. 561,684

4 Claims. (Cl. 260—59)

This invention relates to a method for the preparation of aryl hydroxy alkylene ethers of phenol-formaldehyde resins and has particular reference to the preparation of certain poly-(aryl hydroxy alkylene ethers) of novolaks (herein referred to as polyalcohols) based essentially on the common, tri-functional phenol, $C_6H_5OH$. More particularly it relates to styrene oxide derivatives of phenolic novolaks. The invention is also concerned with the compositions which may advantageously be obtained by the practice of such a method.

Although U.S. Patent No. 2,422,637 (to Thomas) discloses certain reaction products of phenol and styrene oxide and in U.S. Patents Nos. 2,499,365 (to De Groote et al.); and 2,705,704 (to Sorenson), reference has been had to the employment of aryl alkylene oxides, including styrene oxide, as reactant-materials for preparing derivatives of phenolaldehyde resins, the products which are obtainable from application of the teachings of these patents are neither like nor equivalent to the compositions which may be obtained according to the method of the present invention.

It would be desirable to prepare resinous polyalcohol materials from novolaks, which polyalcohol materials could be esterified with drying or semi-drying oil fatty acids for employment in oleoresinous types of coatings having exceptional chemical and solvent resistance, particularly to caustic and alkali solutions, and being imbued with other desirable characteristics. It would also be advantageous for such materials to be available in a form provided by a greater, and frequently substantially complete, degree of etherification between the reactant ingredients and to have a minimized presence of undesirable by-product substances with the materials. The accomplishment of these and other ends is among the principal objectives and advantages of the present invention.

According to the present invention, resinous polyalcohols having the desired characteristics may be prepared by reacting, in the presence of a strong base and at a temperature between about 110 and 130° C., a novolak made from common phenol and formaldehyde and containing from three to ten phenolic units in its molecule with a sufficient quantity of styrene oxide to etherify at least about 70 percent of the phenolic hydroxyl groups originally present in the novolak until substantially all of the styrene oxide has been reacted. Advantageously, the reaction may be conducted while the novolak is dispersed or dissolved in a suitable, inert solvent such as dioxane and the like. Highly etherified compositions may be obtained according to the method of the present invention. Such compositions have actual molecular and hydroxyl equivalent weights which are extremely close to theoretical values. It is frequently possible in the compositions of the present invention to achieve 100 percent etherification of the phenolic hydroxyl groups originally present in the novolak. In addition, the compositions are substantially free from undesirable by-product materials such as polymerized styrene oxide and the like.

Generally the reaction may be conducted suitably with from about 0.7 to about 1.5 moles of the styrene oxide for each phenolic hydroxide of the novolak condensate, although it is preferable to employ only a slight excess, such as about 1.1 moles, of the oxide per phenolic hydroxide in the condensate in order to insure a relatively greater or substantially complete degree of etherification. Usually the reaction is completed within a period of about 48 hours although in many instances reaction periods as short as 24 hours and less may be sufficient in order to obtain satisfactory results.

The strong base employed as a catalyst for the reaction is preferably an alkali metal hydroxide such as sodium or potassium hydroxide which, advantageously, is employed in an amount between about 0.2 and 1.5 percent by weight, based on the weight of the novolak which is present in the reaction mass.

In preparing the polyalcohols it is preferable to employ any novolak having the indicated molecular characteristics which is based on formaldehyde and common phenol, $C_6H_5OH$, regardless of the particular method which is employed for its manufacture. Thus, the novolak may be made under reflux conditions at atmospheric pressure, in the conventional manner, or it may be made at elevated temperatures and pressures, particularly according to the procedures described in the copending applications Serial Nos. 382,851, and now Patent No. 2,838,473, and 382,852, and now abandoned, both filed September 28, 1953, in both of which at least one of the present inventors is a coapplicant. The optimum molecular ratio of aldehyde to phenol which may be employed in manufacturing the novolaks varies somewhat with the particular method which is utilized. Generally the ratio falls between about 0.65 and 0.95 mole of aldehyde per mole of phenol with greater advantages being frequently obtainable when the ratio is between about 0.75 and 0.85. Usually the novolaks may be prepared by condensing the aldehyde and phenol in the presence of an acid catalyst, such as oxalic, hydrochloric or sulfuric acids. Sometimes, however, useful products may be obtained from alkali-catalyzed condensations.

Novolaks prepared from the common phenol are preferred for etherification with styrene oxide not only for the reasons of economy and availability but also because of the difficulties, ordinarily due to steric hindrance, which may be encountered when novolaks from substituted phenols are employed for this purpose. However, novolaks in which minor amounts of substituted phenols are present in the condensed product may frequently be employed, provided the substituents are not available in such relative proportions as might give rise to steric obstructions to the desired reaction with styrene oxide.

As has been indicated, the polyalcohols of the present invention differ from those of the prior art in their relatively greater degrees of etherification and in their more desirable and more nearly theoretical molecular and hydroxy equivalent weights. When polyalcohols which are less completely etherified are esterified with drying oil fatty acids, considerably darker oils are formed which result in dark and frequently undesirable films. Moreover, when the degree of underetherification in such polyalcohols is very great, it may cause films made from oils prepared with such polyalcohols to have a seriously impaired caustic resistance.

The following examples illustrate the practice of the present invention.

EXAMPLE I

A novolak was prepared from common phenol with about 0.82 mole of formaldehyde per mole of phenol in the presence of about 0.7 percent by weight of sulfuric acid, based on the weight of the phenol, and water in an amount by weight equal to the amount of phenol. The reaction was conducted in a Pfaudler reactor at elevated temperatures and pressures according to the procedure set forth in copending application Serial No. 382,852, filed September 28, 1953. After being neutralized, purified and dried, about 500 grams of the novolak was dissolved in about 250 grams of dioxane to which was added about 10 grams of an aqueous solution of caustic soda containing about 50 percent by weight of NaOH. The mixture was placed in a high pressure, rocking-type laboratory reactor and slowly heated until a steady temperature of about 115° C. was attained. At this point, about 625 grams of styrene oxide, which constituted about 1.1 moles of the oxide per hydroxyl equivalent of the novolak, was added. The reactants were maintained at a temperature between about 110 and 120° C. while being heated for a period of about 65 hours, after which the reaction mass was cooled, neutralized with citric acid, devolatilized to free the polyalcohol from solvent and unreacted styrene oxide, washed with hot water and dried. There was obtained a practically quantitative yield consisting of about 1076 grams of a resinous polyalcohol having a molecular weight of about 1455 and an equivalent weight of about 225 grams per alcoholic hydroxyl group. This is the exact theoretical value and indicates that a 100 percent etherification had occurred without byproduct formation.

An ester was prepared with the polyalcohol by cooking together about 198 grams of the polyalcohol and about 126 grams of linseed oil fatty acids under a nitrogen atmosphere for about 6.5 hours at about 230° C. The amount of oil fatty acid used was 0.8 of the amount theoretically equivalent to the alcohol groups in the polyalcohol. The residual acid number of the cooked mass was found to be about 9.6 and the viscosity of a 70 percent solution of the ester in xylene (at room temperature) was about 1400 centipoises. The numerical color rating of the 70 percent xylene solution was about 14 on the Gardner color scale. Films of this ester dried rapidly in air to give tough, lightly colored coatings having a color when dried of about 2 on the Gardner scale. The air dried coatings, which had a Sward Rocker hardness value of about 22, remained strong and intact after 7 days exposure to a 2 percent by weight aqueous solution of caustic soda. A film of the ester baked for 30 minutes at 150° C. (hardness 24) remained clear, strong and tough after 2 weeks of the same exposure. Similar results were obtained with esters prepared from the polyalcohol and soya oil fatty acids.

EXAMPLE II

A novolak having a molecular weight of about 800 was prepared in a pressure vessel by reacting, at 150° C. for one hour, about 8235 grams of common phenol with about 5900 grams of formalin (to provide an aldehyde to phenol ratio of about 0.82) in the presence of about 8590 milliliters of supplementary water and about 82.4 grams of phosphoric acid containing about 85 percent by weight of $H_3PO_4$. After being reacted, the novolak-containing mass was cooled to about 80° C., neutralized with caustic solution, washed four times with water and devolatilized. About 5200 grams of the novolak, dissolved in about 5000 grams of dioxane, was placed in a pressure reactor into which was then added about 150 grams of a 50 percent aqueous solution of potassium hydroxide (about 1.45 percent by weight, based on the weight of the novolak) and about 6830 grams of styrene oxide, which constituted about 1.15 moles of the oxide per hydroxyl equivalent of the novolak. The reaction mass was maintained at a temperature of about 115° C. for a reaction period of about 36 hours. It was then cooled to about 80° C. and neutralized with citric acid. The dioxane solvent and unreacted styrene oxide were removed by distillation, after which the remaining polyalcohol was separately washed four times with hot water and dried under a vacuum. The cryoscopic molecular weight of the polyalcohol was found to be 1400 and it had an hydroxyl equivalent weight of about 230 and a melting point of about 94° C.

Esters prepared in a similar manner to that set forth in Example I with various oil fatty acids provided excellent caustic resistant films with properties which were determined by conventional techniques, as indicated in the following table. The table also includes details relating to the preparation of each film.

*Table I*

| Fatty acid ester | Weight of polyalcohol, gms. | Oil fatty acids charged | | | | Cooking Schedule, temp., ° C., and time, hrs. | Final acid number of ester | Viscosity of ester in 70 percent xylene solution, cps. | Tack-free drying time in air, hrs. | Gardner color of dried film | Sward hardness | | Caustic resistance 2% aqueous solution | |
|---|---|---|---|---|---|---|---|---|---|---|---|---|---|---|
| | | Type of oil fatty acid | Weight of oil, gms. | Percent by weight of oil in charge | Mols. oil per alcoholic equiv. weight of polyalcohol | | | | | | Air dried | Baked 30 min., 150° C. | Air dried | Baked 30 min., 150° C. |
| A | 109 | Soya | 91 | 45.5 | 0.7 | 240°/6.0 | 10.7 | 1,400 | 1.16 | 5 | 27 | 20 | 7 to 14 days | >14 days. |
| B | 180.5 | Linseed | 169.5 | 48.5 | 0.8 | 240°/2.8 | 21.0 | 630 | 1.25 | 3 | 31 | 45 | ---do---- | >28 days. |
| C | 220.5 | ---do--- | 129.5 | 37.0 | 0.5 | 240°/2.8 | 9.9 | 6,000 | 0.66 | 4 | 48 | 48 | 7 to 28 days | >10 weeks. |
| D | 180.5 | Linseed and glycerol. | 169.5 and 2.1. | 48.5 and 0.6. | 0.8 and 0.1. | 240°/3.0 and 240°/2.0. | 18.9 and 10.6. | 870 and 2,270. | 1.00 | 4 | 32 | 31 | 1 to 7 days | >10 weeks. |

NOTE.—Glycerol was added after 3 hrs. of esterification with linseed oil fatty acid to react with remaining unreacted fatty acid in order for a low acid number to be obtained without an excessive viscosity build up.

EXAMPLE III

For purposes of comparison, several polyalcohols were prepared in a manner closely similar to that of Examples I and II from novolaks and styrene oxide at relatively higher and less closely controlled temperatures. In all cases, as indicated in the following table, they were found to have lower cryoscopic molecular weights and higher hydroxyl equivalent weights. This indicated that a less complete etherification had occurred and greater formation of undesired by-products had taken place. A novolak from common phenol and formaldehyde, similar to those employed in the first two examples, was used for preparation of the various polyalcohols.

Table II

| Polyalcohol | Molecular weight of novolak | Reaction conditions | | | | | Polyalcohol properties | |
|---|---|---|---|---|---|---|---|---|
| | | Ratio—Moles of styrene oxide per hydroxyl equivalent weight of novolak | Percent by weight NaOH catalyst, based on weight of novolak | Percent by weight dioxane solvent, based on weight of novolak | Heating schedule | | Cryoscopic molecular weight | Hydroxyl equivalent weight (gms.) |
| | | | | | Average temp., °C., and time, hrs. | Max. temp., °C., attained during reaction | | |
| D | 706 | 1.08 | 0.3 | 67 | 160°/5.0 | 230 | 1,275 | 242 |
| E | 722 | 1.12 | 0.3 | 50 | 165°/6.0 | 190 | 1,202 | 248 |
| F | 762 | 0.7 | 0.3 | 50 | 160°/4.0 | 200 | 1,307 | 281 |
| G | 762 | 1.1 | 0.3 | 75 | 160°/5.5 | 190 | 1,307 | 248 |

Film coatings obtained from oil fatty acid esters of the less completely etherified polyalcohols were found, in general, to have poorer and less desirable properties and characteristics than the films obtained from esters of the Examples I and II polyalcohols.

By way of contrasting illustration with the foregoing examples, a phenolic product was prepared according to the teachings of U.S. Patent No. 2,422,637 by charging about 141 grams (1.5 moles) of phenol into a three-neck round bottom flask provided with an efficient stirring mechanism and a glass heating mantle and heating it to a temperature of about 150° C. When this temperature was reached, about 120 grams (1.0 mole) of styrene oxide was added dropwise over a 50 minute period. The exothermic heat of reaction caused the temperature of the reacting mass to attain about 165° C. for a short period during the addition of styrene oxide. The heating was continued at about 150° C. for about nine hours without apparent change in the vicosity of the reaction mass. After the heating period had been terminated, the reaction mass was subjected to distillation under a vacuum of about 1 mm. Hg at the same temperature as was employed for the heating. This removed unreacted phenol and quantities of what appeared to be 1-phenyl, 2-phenoxy ethanol. A viscous mass having a molecular weight of about 287 and an hydroxyl equivalent weight of 317 grams was obtained. A similar phenolic product was obtained when the procedure was repeated at a reaction temperature of about 180° C.

In order to further evaluate the thereby-obtained product, a small quantity of it was mixed with about 15 percent by weight of hexamethylenetetramine and subjected to a stroke cure test as is conventionally employed for purposes of testing thermosetting resins. There was no evidence of curing even after 10 minutes of heating at 160° C. This is significant in view of the fact that, pursuant to common understanding, phenolic type resins, which, according to the reference, were apparently expected to have been formed, are readily curable by such procedure. When about 61 grams (0.193 equivalent) of the reaction product was heated under an atmosphere of nitrogen for about 6.0 hours at 240° C. with about 39 grams (0.135 equivalent) of soya oil fatty acids (0.7 of the theoretically equivalent amount), a product having an acid number of 29.6 was obtained. The viscosity of a 70 percent solution of the product in xylene (at room temperature) was about 40 centipoises and its color on the Gardner scale was 16. When conventional driers were added to this product and it was cast as a film on glass, it required 3.75 hours for the film to air dry to a tack-free state at room temperature. The dried film had a very dark color and a Sward hardness of only 12. A film of the product which was baked for 30 minutes at 150° C. had a Sward hardness of about 33. Both films had very poor resistance to a 2 percent aqueous solution of sodium hydroxide, being weakened severly within one hour after immersion in such a solution and completely disintegrating in the solution within 24 hours after immersion.

For purposes of further contrast, a phenolic product was prepared using similar apparatus according to the teachings to be found in Example 361a of U.S. Patent No. 2,499,365. About 764 grams of common phenol $C_6H_5OH$, were reacted at reflux temperature with 613 grams of formalin (to provide a 1.0:0.91 phenol to aldehyde molar ratio) in the presence of about 11.4 grams (1.5 percent by weight) of ammonium chloride. After a one hour period of reaction, a phase separation occurred. The supernate, which contained about 6.94 percent by weight of formaldehyde (indicating that the formaldehyde content of the product was about 0.79 mole per mol of phenol), was decanted. The product layer was washed with water, then devolatilized according to directions to be found in the patent disclosure. The molecular weight of the resin thereby produced was found to be about 184. About 200 grams of the product were reacted with 200 grams of styrene oxide according to the manner set forth in the example. About 9 milliliters of water were collected in a condenser trap which was employed with the reaction vessel. About 391 grams of a low melting solid resin, having a molecular weight of about 410 and a hydroxyl equivalent weight of about 234, was obtained. Films prepared from soya oil fatty acid esters of the product were extremely soft and dark brown in color. They had decidedly inferior caustic resistance in comparison to films from oil fatty acid esters of the polyalcohols of the present invention.

The styrene oxide-containing polyalcohols of the present invention are especially well suited for employment in oleoresinous films when the films are in accordance with the disclosure contained in the copending application of Alexander M. Partansky having Serial No. 561,660 which was concurrently filed January 26, 1956.

What is claimed is:

1. Method which comprises etherifying a phenol-formaldehyde novolak which is the reaction product of phenol and formaldehyde and which has from three to ten phenol nuclei per molecule and between about 0.65 and 0.95 mole of aldehyde per mole of phenol therein, in the presence of a quantity of a strong basic catalyst that is equivalent in basicity to an amount of sodium hydroxide between about 0.2 and 1.5 percent by weight, based on the weight of the novolak being etherified, and at a temperature between about 110 and 130° C. with from about 0.7 to about 1.5 moles per phenol nucleus of styrene oxide and continuing the reaction until at least about 70 percent of the phenolic hydroxyl groups originally present in the novolak are monoetherified.

2. The method of claim 1 wherein about 1.1 moles of styrene oxide are employed per phenol nucleus in the novolak and wherein the reaction is continued until substantially all of the phenolic hydroxyl groups originally present in the novolak are etherified.

3. The method of claim 2 wherein the catlayst is an alkali metal hydroxide employed in an amount between about 0.2 and 1.5 percent by weight, based on the weight of the novolak being etherified.

4. A resinous polyalcohol obtained as the product of the method of claim 1, said resinous polyalcohol consisting of the etherified product of a phenol-formaldehyde novolak which is the reaction product of phenol and formaldehyde and which has from three to ten phenol nuclei per molecule, contains between about 0.65 and 0.95 moles of aldehyde per mole of phenol therein, and is etherified with from about 0.7 to 1.1 moles per phenol nucleus of styrene oxide wherein at least about 70 percent of the phenolic hydroxyl groups originally present in the novolak are monoetherified, said product being substantially free of polymerized styrene oxide substituents therein, said product being further characterized in having about theoretical molecular and hydroxyl equivalent weights.

References Cited in the file of this patent

UNITED STATES PATENTS

| | | |
|---|---|---|
| 2,499,365 | De Groote et al. | Mar. 7, 1950 |
| 2,705,704 | Sorenson | Apr. 5, 1955 |
| 2,714,098 | Martin | July 26, 1955 |
| 2,716,099 | Bradley et al. | Aug. 23, 1955 |